United States Patent

[11] 3,568,645

| [72] | Inventor | Clarence H. Grimm |
| | | 2734 E. Brill St., Phoenix, Ariz. 85008 |
| [21] | Appl. No. | 804,923 |
| [22] | Filed | Mar. 6, 1969 |
| [45] | Patented | Mar. 9, 1971 |

[54] ROTARY COMBUSTION ENGINE
3 Claims, 3 Drawing Figs.

[52] U.S. Cl. ............................................. 123/8.45,
418/264
[51] Int. Cl. .............................................. F02b 53/00
[50] Field of Search ............................................. 123/16,
8.45; 103/136 (R), 2; 91/139; 418/264, 259—269

[56] References Cited
UNITED STATES PATENTS

| 813,018 | 2/1906 | Okun ........................... | 123/16(X) |
| 1,269,937 | 6/1918 | Hutsell ........................ | 123/16 |
| 1,354,189 | 9/1920 | Evans et al ................... | 123/16 |
| 2,298,525 | 10/1942 | Briggs .......................... | 123/16 |

FOREIGN PATENTS

| 448,226 | 5/1948 | Canada ........................ | 123/16 |

*Primary Examiner*—Allan D. Herrmann
*Attorney*—Willard L. Groene

ABSTRACT: A rotary vane type internal combustion engine in which the radial positioning of the vane during the rotation of the engine rotor shaft is positively positioned relative to the outer shell of the engine, independent of the contact of the outer end of the vane and the inner surface of the outer shell.

PATENTED MAR 9 1971 3,568,645

INVENTOR.
CLARENCE H. GRIMM.
BY
Willard S. Groen
ATTORNEY.

3,568,645

ROTARY COMBUSTION ENGINE

BACKGROUND OF THE INVENTION

This invention pertains to rotary internal combustion engines, and is particularly directed to radially reciprocating vane type engines in which the radial oscillation of the vanes relative to the outer shell is positively controlled.

Heretofore, rotary engines of the above type relied on the outer end contact of the vanes with the outer shell together with springs urging the vanes outwardly to radially reciprocate the vanes in response to engine rotation. This has limited high speed operation and caused engine failure as the vanes became gummed up after long use of the engine, and failed to reciprocate properly so as to maintain compression in the engine.

SUMMARY OF THE INVENTION

One of the objects of this invention is to provide a vane type rotary internal combustion engine in which the vanes are positively radially actuated during the rotation of he rotor of the engine.

Another object is to provide in radial vane internal combustion engine having a rotor with radially reciprocatable vane a positive cam means for accurately positioning the vanes relative to the inner surface configuration of the surrounding shell of the engine.

DESCRIPTION OF THE PREFERRED EMBODIMENT

Figures 1, 2, 3:
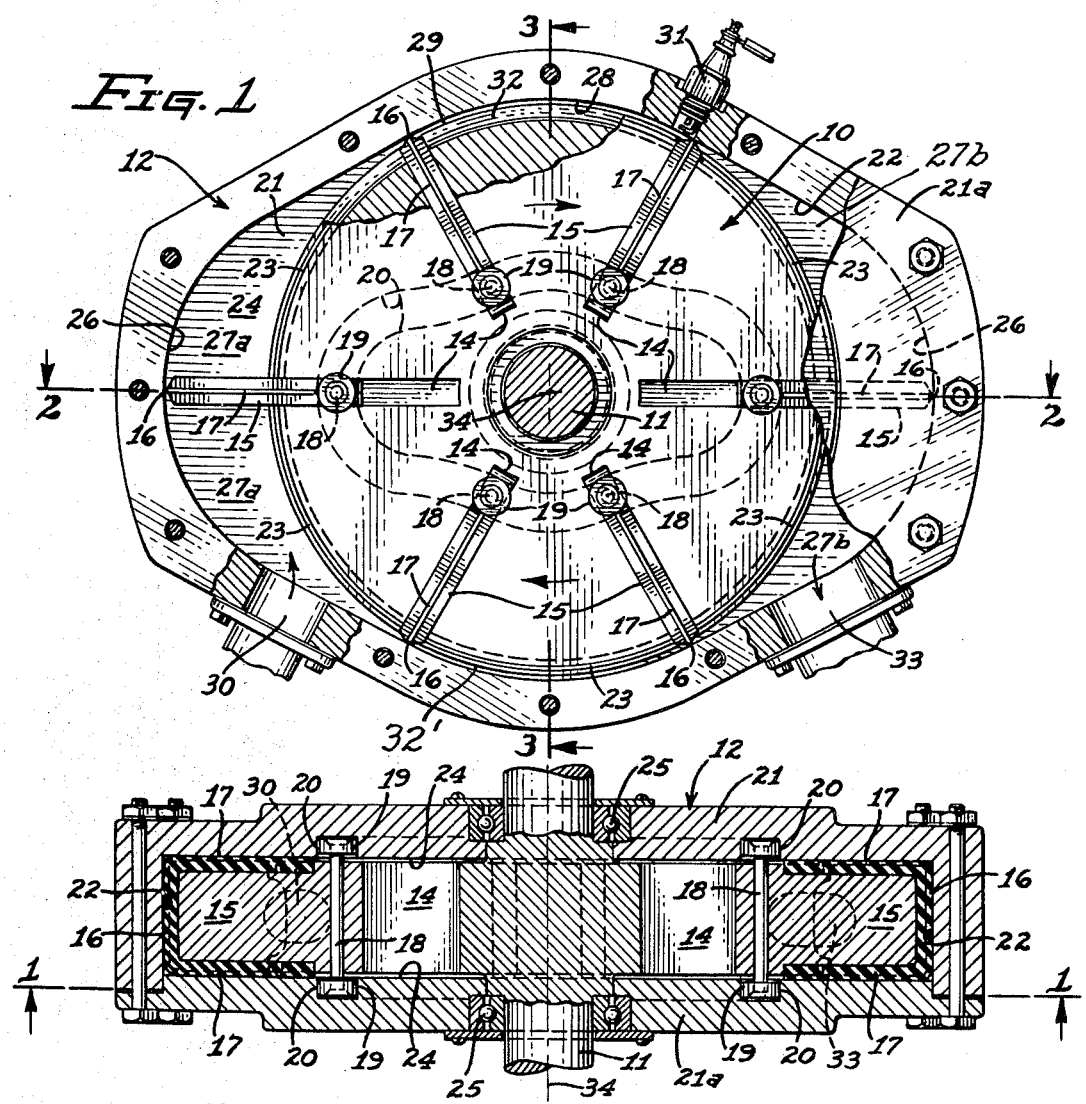
FIG. 1 is an end elevation, partly broken away, of a vane type rotary internal combustion engine, incorporating the features of this invention, and shown in section on the line 1–1 in FIG. 2.
FIG. 2 is a radial sectional view on the line 2–2 of FIG. 1.
FIG. 3 is a radial sectional view on the line 3–3 of FIG. 1.

The rotary motor comprises a rotor 10 having a rotor shaft 11 and a shell 12. The rotor 10 is disc-shaped with a concave peripheral outside surface 13 to form a combustion chamber. Radially disposed slots 14 are formed at circumferentially spaced positions in the rotor to slidingly receive the vanes 15. Seals 16 and 17 are provided at the outer ends and side edges of the vanes. The inner ends of the vanes have shafts 18 on the ends of which are journaled cam rollers 19 operating in cam slots formed in the sidewall 2 and the cover portion 21a to positively control the radial movement of the vanes in proper relationship to the inner surfaces 22 of the shell 12. The rotor further has arcuate blade seals 23 engaging the inner side surfaces of the shell forming a substantially closed circle around the perimeter of he rotor.

The rotor shaft 11 is journaled on suitable bearings 25 in the sides 21 of the shell 12. The inner surface 22 is made elongated at the two ends 26 making large intake and compression chambers 27a and 27a' and exhaust chambers 27b and 27b' on the ends, and with arcuate surfaces 28 that follow closely the diameter of the periphery 29 of the rotor 10a at the top and bottom for substantially one-sixth of the circumference of the rotor.

A fuel mixture enters left-hand large chamber 27a of the motor through the intake port 30 in the shell 12. A spark plug 31 is located in the shell 12 at the end of the close firing chamber 32 formed between the rotor concave outer surface 13 and shell surface 28 before the right-hand large chamber 27b, FIG. 1. The exhaust port 33 is connected into the right-hand large chamber 27b'.

OPERATION

In this arrangement six vanes are utilized and when rotating clockwise, FIG. 1, form six chambers by the vanes, rotor and outer shell which all move in order past the intake port 30 into the large chamber 27a at the left, taking in fuel and air, compressing it in chamber 27a' and then firing it in the close chamber 32 at the top as it starts to move into the right large chamber 27b passes the spark plug 31. Normally, the burning chamber 27b ahead will fire back into this area and ignite the compressed charge making spark plug operation unnecessary at higher speeds.

The fired charge then expands into the right large chamber 27b' and passes the exhaust port 33 discharging the gasses and moves into the close chamber 32' at the bottom which serves as a gas blocking means between the exhaust and the inlet ports. This produces six power strokes per revolution of the shaft 11. The power is against the vane 15 at a point some distance from the shaft axis giving excellent mechanical advantage to produce good torque from the engine.

I claim:

1. A rotary combustion engine comprising in combination: surface;
   a. a rotor having an output rotor shaft, said rotor being provided with a concave peripheral surface,
   b. an outer shell rotatably supporting the rotor shaft and having an oval-shaped cavity around the periphery of the rotor;
   c. a plurality of radially disposed vanes movably mounted in the rotor for radial movement relative to the axis of rotation of the rotor;
   d. means interconnected between the outer shell and the vanes to radially actuate the vanes upon rotation of the rotor to positively maintain positioning of the outer ends of the vanes in close operative proximity to the peripheral surface of the oval-shaped cavity; and
   e. said oval-shaped cavity being elongated at two diametrically opposed ends to form at one end intake and compression chambers and at the other end burning and exhaust chambers with diametrically opposed firing gas blocking chambers in between said intake and compression chambers and said burning and exhaust chambers, said firing and gas blocking chambers being of like configuration and conforming to the arcuate concave peripheral surface of said rotor, said firing chamber being of sufficient length to provide space for compressing the fuel without releasing part of the compressed gases and said gas blocking chamber being of sufficient length to block at all times said intake chamber from said exhaust chamber.

2. A rotary combustion engine as in claim 1 wherein the means for radially actuating the vanes includes a cam slot formed in the other shell and cam rollers on the inner ends of the vanes operatively engaging in the cam slots.

3. A rotary combustion engine as in claim 1 wherein:
   f. an intake port in the shell is connected into the intake suction portion of the intake chamber;
   g. an exhaust port in the shell is connected into the exhaust portion of the exhaust chamber; and
   h. a spark plug arranged in the shell having its points to one side of the top close firing chamber and adjacent the burning chamber.